(12) United States Patent
Homma et al.

(10) Patent No.: US 11,518,427 B2
(45) Date of Patent: Dec. 6, 2022

(54) STEERING DEVICE

(71) Applicant: YAMADA MANUFACTURING CO., LTD., Kiryu (JP)

(72) Inventors: Taisuke Homma, Kiryu (JP); Hiromitsu Baba, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/689,047

(22) Filed: Mar. 8, 2022

(65) Prior Publication Data

US 2022/0297741 A1 Sep. 22, 2022

(30) Foreign Application Priority Data

Mar. 19, 2021 (JP) .............................. JP2021-045539
Jan. 11, 2022 (JP) .............................. JP2022-002531

(51) Int. Cl.
*B62D 1/19* (2006.01)
*B62D 1/181* (2006.01)
*B62D 1/185* (2006.01)

(52) U.S. Cl.
CPC ............. *B62D 1/192* (2013.01); *B62D 1/181* (2013.01); *B62D 1/185* (2013.01)

(58) Field of Classification Search
CPC ......... B62D 1/192; B62D 1/181; B62D 1/185
See application file for complete search history.

(56) References Cited

U.S. PATENT DOCUMENTS

| 2019/0152511 | A1* | 5/2019 | Shiroishi | B62D 1/192 |
| 2019/0283793 | A1* | 9/2019 | Matsuno | B62D 1/185 |
| 2020/0039566 | A1* | 2/2020 | Sekiguchi | B62D 1/181 |
| 2020/0207403 | A1* | 7/2020 | Kirmsze | B62D 1/197 |

FOREIGN PATENT DOCUMENTS

| EP | 1296868 B1 * | 9/2010 | ............ B62D 1/181 |
| EP | 2450254 B1 * | 3/2018 | ............ B62D 1/185 |
| JP | 2006-347243 | 12/2006 | |
| KR | 20100031826 A * | 3/2010 | |
| WO | WO-2015064345 A1 * | 5/2015 | ............ B62D 1/184 |
| WO | WO-2019149714 A1 * | 8/2019 | ............ B62D 1/184 |
| WO | WO-2021193451 A1 * | 9/2021 | |

* cited by examiner

*Primary Examiner* — Drew J Brown
(74) *Attorney, Agent, or Firm* — Rankin, Hill & Clark LLP

(57) ABSTRACT

In a steering device according to an aspect of the present disclosure, a load absorbing mechanism includes a large diameter shaft portion provided in an EA block, a long hole provided in a housing and guiding the large diameter shaft portion at the time of a secondary collision, a guide plate projecting inside the long hole and having a resistance portion plastically deformed by the large diameter shaft portion at the time of the secondary collision, and an EA guide overlapping the guide plate when viewed in a front-rear direction, provided in the EA block to be slidable on the guide plate at the time of the secondary collision, and formed of a material having a friction coefficient smaller than that of the EA block.

8 Claims, 9 Drawing Sheets

STEERING DEVICE

BACKGROUND OF THE INVENTION

Field of the Invention

The present disclosure relates to a steering device.

Priority is claimed on Japanese Patent Application No. 2021-045539, filed on Mar. 19, 2021 and Japanese Patent Application No. 2022-002531, filed on Jan. 11, 2022, the contents of which are incorporated herein by reference.

Description of Related Art

As a steering device, a configuration is known which includes an inner column that supports a steering shaft to be rotatable and an outer column that supports the inner column to be movable in a front-rear direction (for example, refer to Japanese Unexamined Patent Application, First Publication No. 2006-347243).

In this type of the steering device, when a predetermined load acts on the steering shaft at the time of a secondary collision, the inner column moves forward with respect to the outer column (so-called collapse stroke). In this manner, a configuration that cushions an impact load applied to a driver is mounted on the steering device.

For example, according to Japanese Unexamined Patent Application, First Publication No. 2006-347243, the inner column moves forward while a guide projection provided on the inner column side expands a guide groove formed in the outer column at the time of a secondary collision. The steering device is configured to cushion the impact load applied to the driver at the time of a secondary collision by generating sliding resistance between the guide projection and an inner peripheral surface of the guide groove.

In the steering device, when the sliding resistance is generated in an unexpected location at the time of the secondary collision, there is a possibility that desired load fluctuations may not be obtained. As a result, there is a possibility that the steering device known in the related art may be less likely to secure desired impact absorbing performance.

SUMMARY OF THE INVENTION

The present disclosure aims to provide a steering device which easily secures desired impact absorbing performance.

In order to solve the above-described problem, the present disclosure adopts the following aspects.

(1) According to an aspect of the present disclosure, a steering device is provided including a shaft support portion configured to support a steering shaft to be rotatable around an axis along a front-rear direction, a housing supported by a vehicle body and configured to support the shaft support portion to be movable in the front-rear direction, and a load absorbing mechanism disposed between the shaft support portion and the housing. The load absorbing mechanism includes a sliding portion provided in a first member of the shaft support portion and the housing, a guide plate provided in a second member of the shaft support portion and the housing, and having a guide hole guiding the sliding portion in accordance with a relative movement of the first member with respect to the second member in the front-rear direction at the time of a secondary collision, and a resistance portion projecting inside the guide hole and plastically deformed by the sliding portion at the time of the secondary collision, and a low sliding member provided in one member of the guide plate and the first member while overlapping the guide plate and the first member in a radial direction intersecting with the axis when viewed in the front-rear direction. The low sliding member is formed of a material having a friction coefficient smaller than that of the one member and is configured to be slidable on the other member of the guide plate and the first member at the time of the secondary collision.

According to this aspect, at the time of the secondary collision, the low sliding member slides on the other member. Accordingly, compared to a case where the guide plate and the shaft support portion slide, sliding resistance generated between the first member and the second member can be reduced. In this manner, it is possible to generate desired sliding resistance at a desired location (for example, a location between a resistance portion and a sliding portion). As a result, load fluctuations at the time of the secondary collision can be stabilized, and desired impact absorbing performance is easily secured.

(2) In the steering device according to the above-described aspect (1), it is preferable that the low sliding member is provided in the first member and is configured to be slidable on the guide plate.

According to this aspect, at the time of the secondary collision, the low sliding member slides on the guide plate. Accordingly, compared to a case where the guide plate and the shaft support portion slide, the sliding resistance generated between the first member and the second member can be reduced.

(3) In the steering device according to the above-described aspect (2), it is preferable to adopt the following configuration. The first member is the shaft support portion. The second member is the housing. The shaft support portion includes a pipe supporting the steering shaft to be rotatable, and a pedestal portion protruding outward in the radial direction from the pipe. The sliding portion is fixed to the pedestal portion while protruding outward in the radial direction. The housing accommodates the pedestal portion, and has a slit formed so that the pedestal portion is movable forward at the time of the secondary collision. The low sliding member includes a first reduction portion disposed between the guide plate and the pedestal portion in the radial direction, and a second reduction portion disposed around the pedestal portion and facing an inner surface of the slit.

According to this aspect, at the time of the secondary collision, the sliding resistance generated against the guide plate can be reduced by the first reduction portion. At the time of the secondary collision, an outer surface of the second reduction portion slides on an inner surface of the slit. Accordingly, compared to a case where the outer surface of the pedestal portion slides on the inner surface of the slit, the sliding resistance generated against the housing can also be reduced. Moreover, the outer surface of the second reduction portion comes into contact with the inner surface of the slit. Accordingly, at the time of a secondary collision, it is possible to prevent rotation of the shaft support portion around the axis. In this manner, at the time of a secondary collision, it is possible to prevent the low sliding member from being caught on the inner surface of the slit, and a collapse stroke can be smoothly performed.

During a telescopic operation, the outer surface of the second reduction portion slides on the inner surface of the slit. In this manner, compared to a case where the outer surface of the pedestal portion slides on the inner surface of the slit, it is possible to reduce abnormal noise or the sliding resistance generated during the telescopic operation.

(4) In the steering device according to the above-described aspect (3), it is preferable that the low sliding member is formed in a frame shape when viewed in the radial direction, and the pedestal portion is fitted into the low sliding member.

According to this aspect, rattling or dropping of the low sliding member can be prevented. Accordingly, it is possible to realize a stable telescopic operation and the collapse stroke for a long period of time.

(5) In the steering device according to the above-described aspect (3) or (4), it is preferable that a relief portion located inward in the radial direction with respect to the first reduction portion is formed in a portion of the low sliding member which is located rearward with respect to the sliding portion.

According to this aspect, a deformation mark (burr or the like) generated when the sliding portion plastically deforms the resistance portion can be prevented from coming into contact with the low sliding member. In this manner, it is possible to prevent the collapse stroke from being hindered by the deformation mark.

(6) In the steering device according to the above-described aspect (1), it is preferable the low sliding member is provided in the guide plate and is configured to be slidable on the first member.

According to this aspect, at the time of the secondary collision, the low sliding member slides on the shaft support portion. Accordingly, compared to a case where the guide plate and the shaft support portion slide, the sliding resistance generated between the first member and the second member can be reduced.

(7) It is preferable that the steering device according to any one of the above-described aspects (1) to (6) further includes a telescopic mechanism provided between the load absorbing mechanism and the housing, and configured to move the load absorbing mechanism and the shaft support portion in the front-rear direction with respect to the housing. It is preferable that the telescopic mechanism includes an actuator coupled to the housing, and a feed mechanism having an engaging portion coupled to the actuator and an engaged portion coupled to the load absorbing mechanism and engaged with the engaging portion in the front-rear direction, and transmitting a driving force of the actuator to the shaft support portion via the engaging portion and the engaged portion.

According to this aspect, at the time of the secondary collision, the engaging portion and the engaged portion come into contact with each other. Accordingly, a movement of the feed mechanism in the front-rear direction with respect to the actuator is restricted. In this manner, at the time of a secondary collision, it is possible to prevent the guide plate from moving forward together with the feed mechanism. Therefore, a load can be effectively generated between the resistance portion and the sliding portion. As a result, desired impact absorbing performance can be secured.

(8) In the steering device according to any one of the above-described aspects (1) to (7), it is preferable that a restriction member overlapping the guide plate in the radial direction and restricting a movement of the guide plate in the radial direction with respect to the sliding portion is provided in a portion of the sliding portion which is located on a side opposite to the first member in the radial direction.

According to this aspect, at the time of the secondary collision, when the load acting between the sliding portion and the resistance portion increases, the guide plate is pressed outward by the sliding portion in the radial direction.

Then, in the guide plate, the sliding portion tries to be separated from the guide hole. In this case, the guide plate comes into contact with the restriction member. In this manner, an outward movement of the guide plate in the radial direction with respect to the housing is restricted. As a result, the sliding portion can be prevented from being separated from the guide plate, and energy absorbed by the load absorbing mechanism can be stabilized over an entire region of the collapse stroke.

According to the above-described respective aspects, the desired impact absorbing performance can be secured.

DETAILED DESCRIPTION OF THE INVENTION

Figure 1:
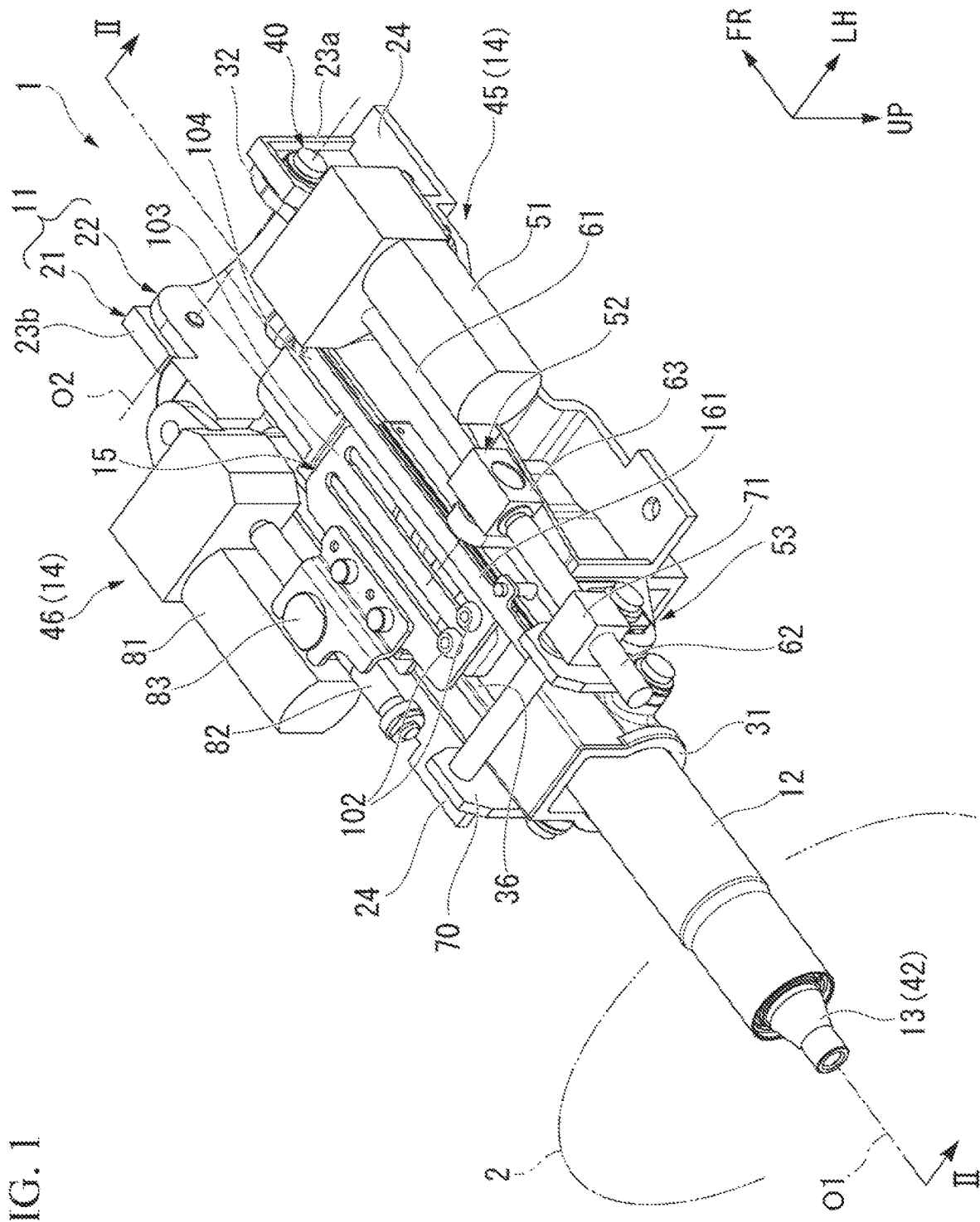
FIG. 1 is a perspective view of a steering device according to a first embodiment.

Hereinafter, embodiments according to the present disclosure will be described with reference to the drawings. In the embodiments or modification examples described below, the same reference numerals will be assigned to corresponding configurations, and description thereof may be omitted in some cases. In the following description, for example, expressions indicating relative or absolute dispositions such as "parallel", "perpendicular", "center", and "coaxial" not only strictly represent the disposition, but also represent a state of relative displacement with an angle or a distance to such an extent that tolerances or the same functions can be obtained.

First Embodiment

[Steering Device 1]

FIG. 1 is a perspective view of a steering device 1.

As shown in FIG. 1, the steering device 1 is mounted on a vehicle. The steering device 1 adjusts a steering angle of vehicle wheels in accordance with a rotational operation of a steering wheel 2.

The steering device 1 includes a housing 11, a pipe (shaft support portion) 12, a steering shaft 13, a drive mechanism 14, and a load absorbing mechanism 15. Each of the pipe 12 and the steering shaft 13 is formed in a cylindrical shape extending along an axis O1. In the following description, an extending direction of the axis O1 of the pipe 12 and the steering shaft 13 will be simply referred to as a shaft axial direction, a direction perpendicular to the axis O1 will be simply referred to as a shaft radial direction, and a direction around the axis O1 will be simply referred to as a shaft circumferential direction, in some cases.

The steering device 1 according to the present embodiment is mounted on the vehicle, where the axis O1 intersects with a front-rear direction. Specifically, the axis O1 of the steering device 1 extends upward as the steering device 1 is directed rearward. In the following description, for the sake of convenience, in the steering device 1, a direction toward the steering wheel 2 in the shaft axial direction will be simply referred to as rearward, and a direction toward a side opposite to the steering wheel 2 will be simply referred to as forward (arrow FR). In the shaft radial direction, an up-down direction, where the steering device 1 is attached to the vehicle, will be simply referred to as an up-down direction (arrow UP represents upward), and a left-right direction will be simply referred to as a left-right direction (arrow LH represents a left side).

<Housing 11>

Figure 2:
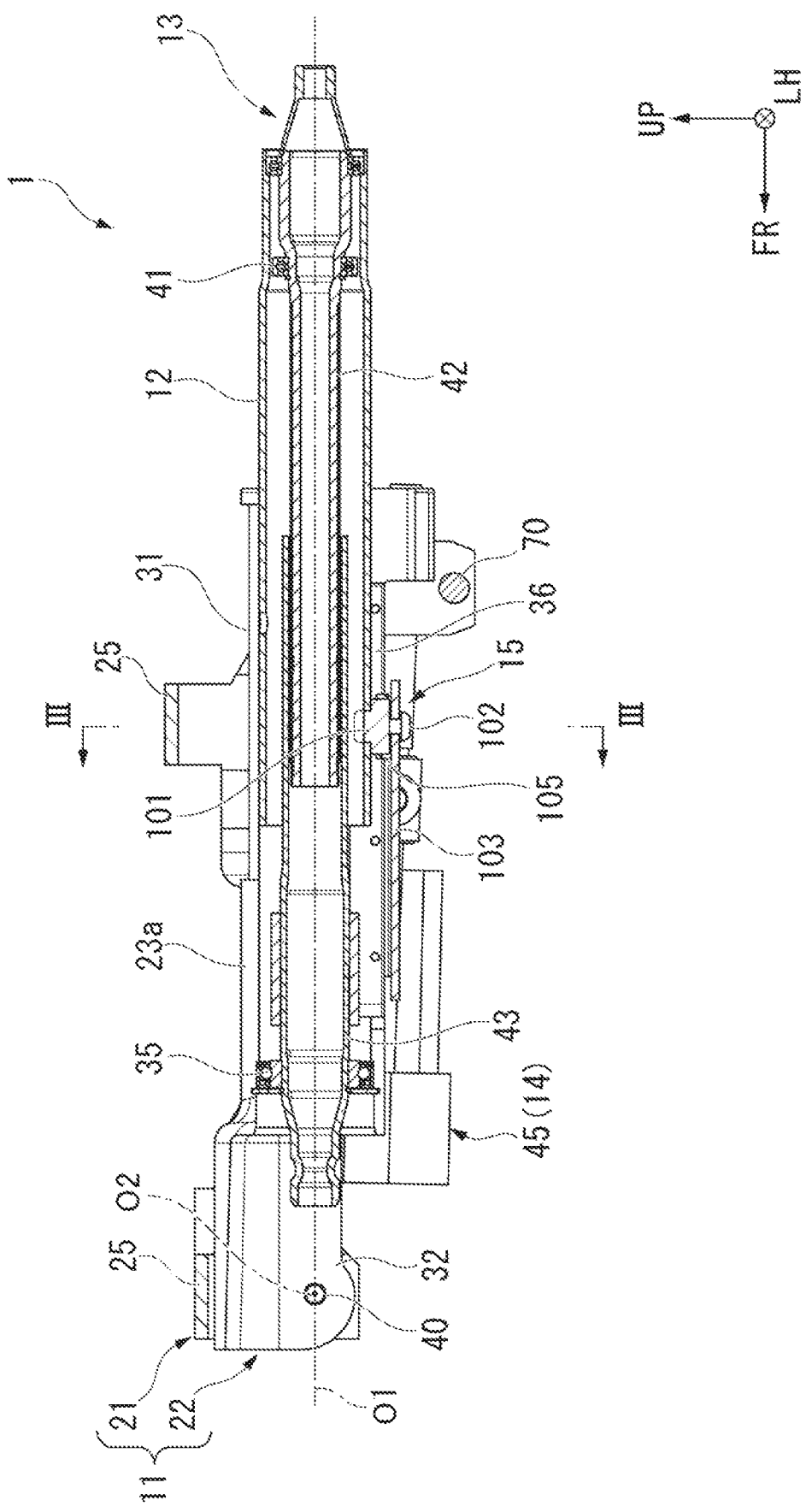
FIG. 2 is a sectional view corresponding to line II-II in FIG. 1.

FIG. 2 is a sectional view corresponding to line II-II in FIG. 1.

As shown in FIGS. 1 and 2, the housing 11 includes a tilt bracket 21 and a housing main body 22.

The tilt bracket 21 is formed in a U-shape which is open downward in a front view when viewed in the front-rear direction. The tilt bracket 21 includes a pair of left and right side frames 23a and 23b, attachment stays 24 formed in the respective side frames 23a and 23b, and bridges 25 for bridging the respective side frames 23a and 23b.

As shown in FIG. 1, the side frames 23a and 23b extend in the front-rear direction while facing each other in the left-right direction.

Each of the attachment stays 24 projects outward in the left-right direction from upper end portions of the side frames 23a and 23b. The housing 11 is supported by a vehicle body via the attachment stay 24.

As shown in FIG. 2, the bridge 25 integrally bridges the upper end portions of the respective side frames 23a and 23b. Each of the bridges 25 is provided in both front and rear end portions of the side frames 23a and 23b.

The housing main body 22 is disposed inside the tilt bracket 21. The housing main body 22 has a holding cylinder 31 and a front side extending portion 32.

The holding cylinder 31 extends in the shaft axial direction (front-rear direction). A front side bearing 35 is fitted (press-fitted) to a front end portion inside the holding cylinder 31. A slit 36 which is open downward is formed in a lower portion of the holding cylinder 31. The slit 36 extends in the front-rear direction behind the front side bearing 35.

Figure 3:
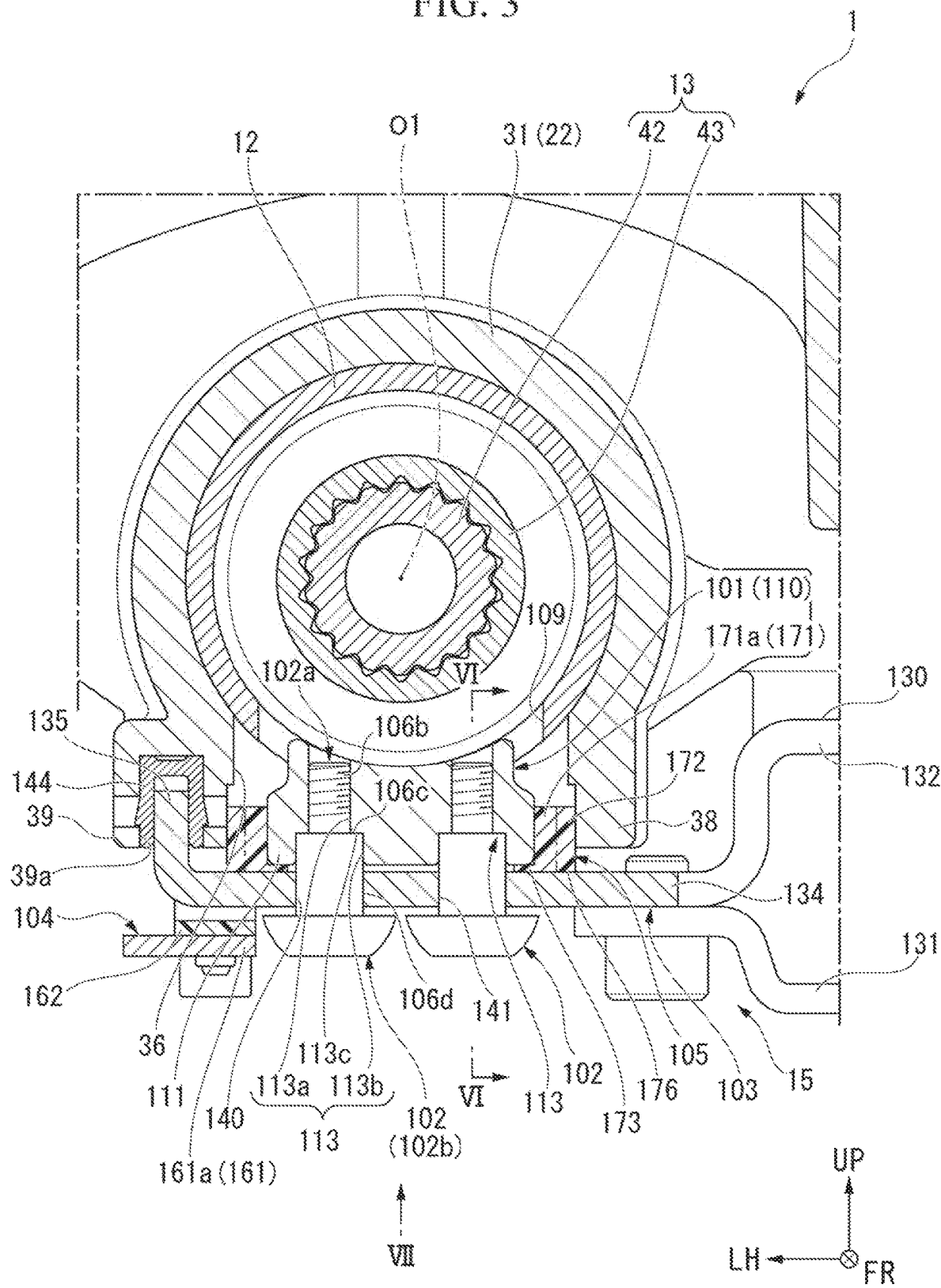
FIG. 3 is a sectional view corresponding to line in FIG. 2.

FIG. 3 is a sectional view corresponding to line in FIG. 2.

As shown in FIG. 3, in the holding cylinder 31, protruding walls (first protruding wall 38 and second protruding wall 39) are formed in opening edges of the slit 36. The first protruding wall 38 protrudes downward from a right opening edge in the opening edges of the slit 36. The first protruding wall 38 extends in the front-rear direction along the right opening edge of the slit 36.

The second protruding wall 39 protrudes downward from a left opening edge in the opening edges of the slit 36. The second protruding wall 39 extends in the front-rear direction along the left opening edge of the slit 36. The second protruding wall 39 has a recess portion 39a which is open downward.

As shown in FIG. 1, the front side extending portion 32 protrudes forward from the holding cylinder 31. The front side extending portion 32 is formed in a U-shape which is open downward in a front view. Each of the front side extending portions 32 is coupled to the side frames 23a and 23b facing each other via a pivot shaft 40 in the tilt bracket 21. In this manner, the housing main body 22 is supported by the tilt bracket 21 to be pivotable around the pivot shaft 40 (around an axis O2 extending in the left-right direction).

<Pipe 12>

The pipe 12 is formed in a cylindrical shape extending in the shaft axial direction. The pipe 12 is inserted into the holding cylinder 31. The pipe 12 is configured to be movable in the shaft axial direction with respect to the holding cylinder 31. As shown in FIG. 2, a rear side bearing 41 is fitted (press-fitted) to a rear end portion of the pipe 12.

<Steering Shaft 13>

The steering shaft 13 includes an inner shaft 42 and an outer shaft 43.

The inner shaft 42 is formed in a cylindrical shape extending in the shaft axial direction. The inner shaft 42 is inserted into the pipe 12. A rear end portion of the inner shaft 42 is press-fitted to the rear side bearing 41 inside the pipe 12. In this manner, the inner shaft 42 is supported to be rotatable around the axis O1 inside the pipe 12. The steering wheel 2 is coupled to a portion protruding rearward from the pipe 12 in the inner shaft 42. The inner shaft 42 may be solid.

The outer shaft 43 is formed in a cylindrical shape extending in the shaft axial direction. The outer shaft 43 is inserted into the pipe 12. The inner shaft 42 is inserted into a rear end portion of the outer shaft 43 inside the pipe 12. A front end portion of the outer shaft 43 is press-fitted to a front side bearing 35 inside the holding cylinder 31. In this manner, the outer shaft 43 is supported to be rotatable around the axis O1 inside the holding cylinder 31.

The inner shaft 42 and the pipe 12 are configured to be movable in the shaft axial direction with respect to the outer shaft 43 and the housing 11. An outer peripheral surface of the inner shaft 42 has a male spline, for example. The male spline engages with a female spline formed on an inner peripheral surface of the outer shaft 43. In this manner, relative rotation with respect to the outer shaft 43 is restricted, and the inner shaft 42 moves in the shaft axial direction with respect to the outer shaft 43. However, a telescopic structure or a rotation restriction structure of the steering shaft 13 can be appropriately changed. In the present embodiment, a configuration has been described in which the outer shaft 43 is disposed forward of the inner shaft 42. However, the present embodiment is not limited only to this configuration. A configuration may be adopted so that the outer shaft 43 may be disposed behind the inner shaft 42.

<Drive Mechanism 14>

As shown in FIG. 1, the drive mechanism 14 includes a tilt mechanism 45 and a telescopic mechanism 46. For example, the tilt mechanism 45 is disposed on the left side of the housing 11. For example, the telescopic mechanism 46 is disposed on the right side of the housing 11. The steering device 1 may be configured not to include the drive mechanism 14 or may be configured to include any of the tilt mechanism 45 and the telescopic mechanism 46 in the drive mechanisms 14.

The tilt mechanism 45 forms a so-called feed screw mechanism. Specifically, the tilt mechanism 45 includes a tilt motor unit 51, a tilt coupling portion 52, and a tilt movable portion 53. The tilt mechanism 45 switches between pivoting restriction and allowance of the steering device 1 around the axis O2 by driving the tilt motor unit 51.

The tilt motor unit 51 is attached to a front end portion of the side frame 23a while projecting outward from the side frame 23a in the left-right direction.

The tilt coupling portion 52 includes a tilt wire 61, a tilt shaft 62, and a tilt coupling 63 that couples the tilt wire 61 and the tilt shaft 62 to each other.

The tilt coupling 63 is supported by the side frame 23a to be rotatable around an axis extending in the left-right direction.

The tilt wire 61 bridges the tilt motor unit 51 and the tilt coupling 63. The tilt wire 61 is configured to be rotatable in accordance with driving of the tilt motor 56. The tilt wire 61 is configured to be flexibly deformable. A connection member connecting the tilt gear box 55 and the tilt coupling 63 to each other is not limited to those which are flexibly deformable like the tilt wire 61.

The tilt shaft 62 bridges the tilt coupling 63 and the tilt movable portion 53. The tilt shaft 62 is rotated together with the tilt wire 61 in accordance with the driving of the tilt motor unit 51. A male screw is formed on an outer peripheral surface of the tilt shaft 62.

The tilt movable portion 53 includes a link member 70 and a tilt nut 71.

The link member 70 is formed in a U-shape which is open upward. The link member 70 is coupled to each of the tilt bracket 21 and the housing main body 22. Specifically, the link member 70 is coupled to the tilt bracket 21 (side frames 23a and 23b) to be pivotable in the front end portion. The link member 70 is coupled to the housing main body 22 (holding cylinder 31) to be pivotable in the rear end portion. The link member 70 is configured to be pivotable around an axis along the left-right direction between the tilt bracket 21 and the housing main body 22.

The tilt nut 71 is attached to a lower portion of the link member 70 toward the outside (left side) in the left-right direction. A female screw is formed on an inner peripheral surface of the tilt nut 71. The tilt shaft 62 meshes with the tilt nut 71. The tilt nut 71 is configured so that a position on the tilt shaft 62 can be changed in accordance with the rotation of the tilt shaft 62.

Figure 4:
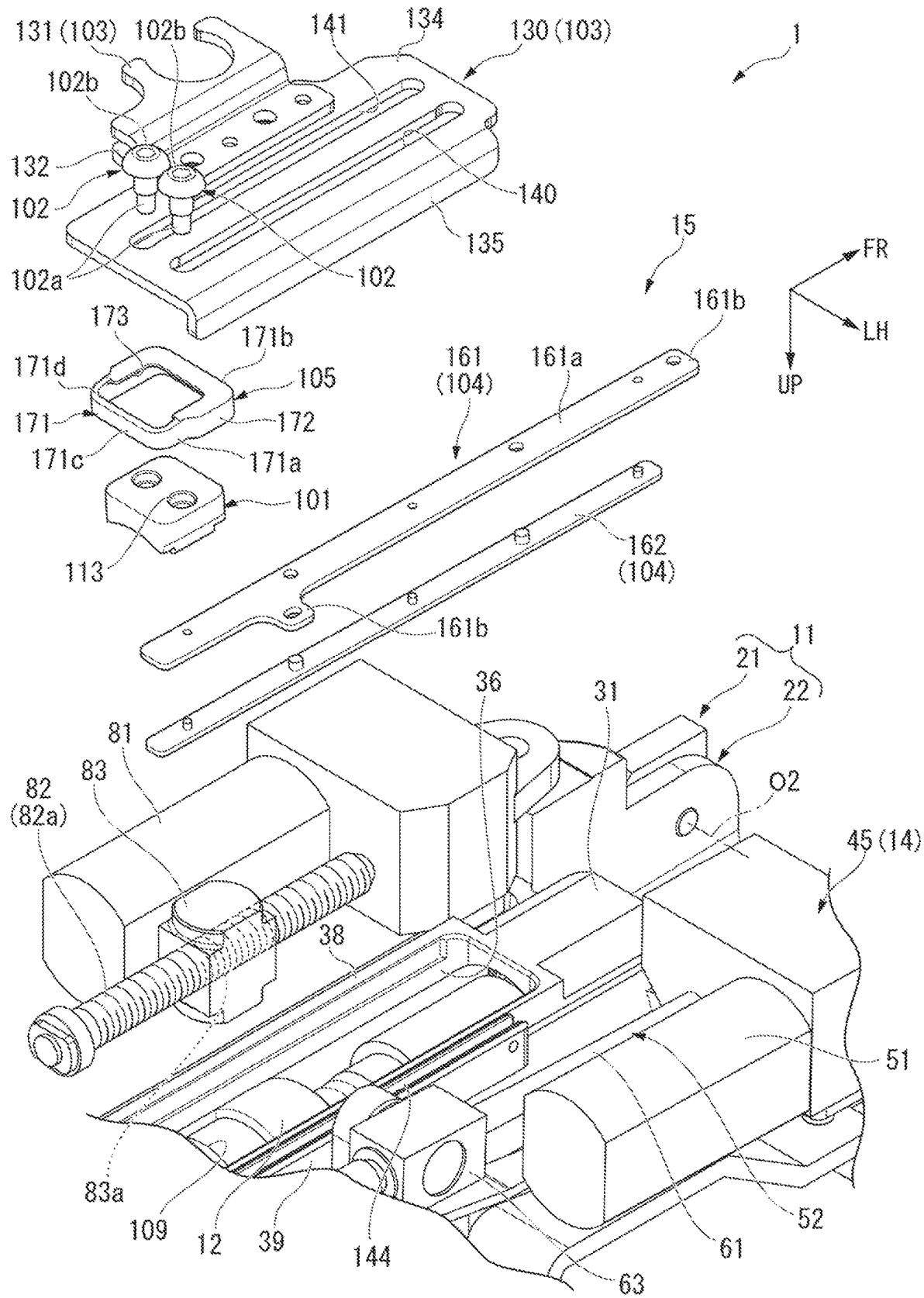
FIG. 4 is an exploded perspective view of the steering device according to the first embodiment.

FIG. 4 is an exploded perspective view of the steering device 1.

As shown in FIG. 4, the telescopic mechanism 46 is a so-called feed screw mechanism. Specifically, the telescopic mechanism 46 includes a telescopic motor unit (actuator) 81, a telescopic coupling portion 82, and a telescopic movable portion (feed mechanism) 83. The telescopic mechanism 46 switches between restriction and allowance of forward and rearward movements of the pipe 12 (steering shaft 13) with respect to the housing 11 by driving the telescopic motor unit 81.

The telescopic motor unit 81 is attached to the front side extending portion 32 while projecting outward in the left-right direction. Therefore, the telescopic motor unit 81 is configured to be pivotable around the axis O2 integrally with the housing main body 22 by a driving force of the tilt mechanism 45. The telescopic motor unit 81 may be supported by the tilt bracket 21 via a wire or the like.

As shown in FIG. 4, the telescopic coupling portion 82 extends rearward from the telescopic motor unit 81. The telescopic coupling portion 82 rotates around the axis in accordance with the driving of the telescopic motor unit 81. A male screw (engaging portion) 82a is formed on an outer peripheral surface of the telescopic coupling portion 82.

The telescopic movable portion 83 is connected to the pipe 12 via the load absorbing mechanism 15. A female screw (engaged portion) 83a is formed on an inner peripheral surface of the telescopic movable portion 83. A male screw 82a of the telescopic coupling portion 82 meshes with the telescopic movable portion 83. The telescopic movable portion 83 engages with the telescopic coupling portion 82 in the front-rear direction via a female screw 83a and the male screw 82a. The telescopic movable portion 83 is configured to be movable on the telescopic coupling portion 82 in accordance with the rotation of the telescopic coupling portion 82.

<Load Absorbing Mechanism 15>

As shown in FIGS. 3 and 4, the load absorbing mechanism 15 connects the telescopic movable portion 83 and the pipe 12 to each other. The load absorbing mechanism 15 transmits a driving force of the telescopic mechanism 46 to the pipe 12 during a telescopic operation (when a load acting on the pipe 12 in the front-rear direction is smaller than a predetermined value), and moves the pipe 12 together with the telescopic movable portion 83 in the front-rear direction with respect to the housing 11. On the other hand, during a secondary collision (when the load acting on the pipe 12 is equal to or greater than the predetermined value), the load absorbing mechanism 15 moves the pipe 12 forward with respect to the housing 11 independently of the telescopic mechanism 46. Specifically, the load absorbing mechanism 15 includes an energy absorbing (EA) block (shaft support portion) 101, an EA bolt 102, an EA plate (guide plate) 103, an EA cover 104, and an EA guide 105.

Figure 5:
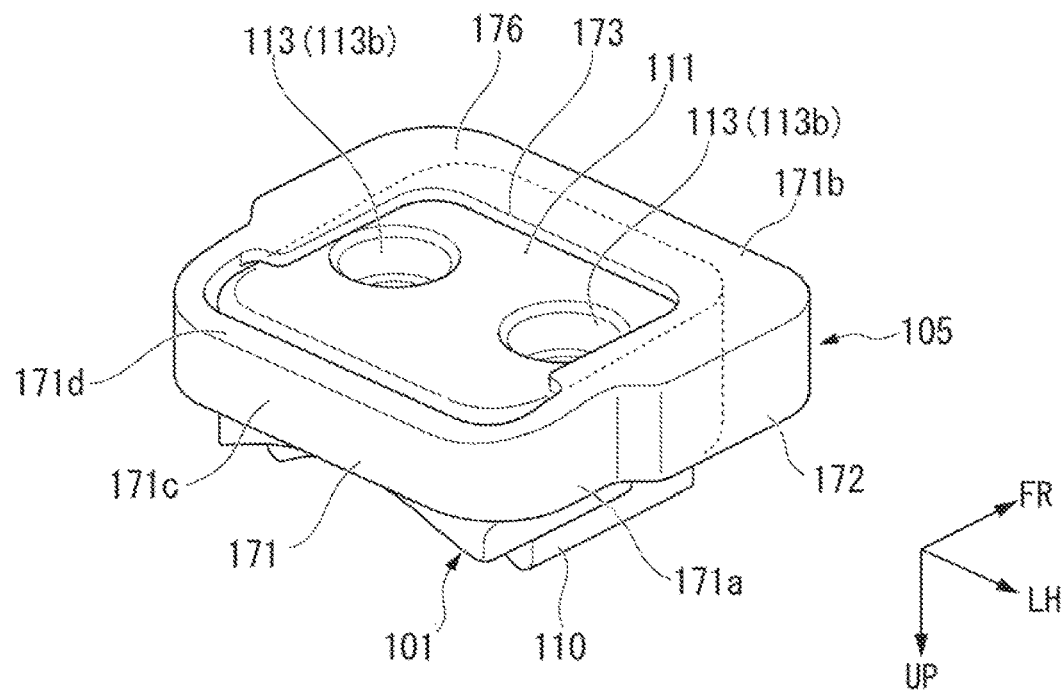
FIG. 5 is a perspective view of an EA block and an EA guide according to the first embodiment.
Figure 6:
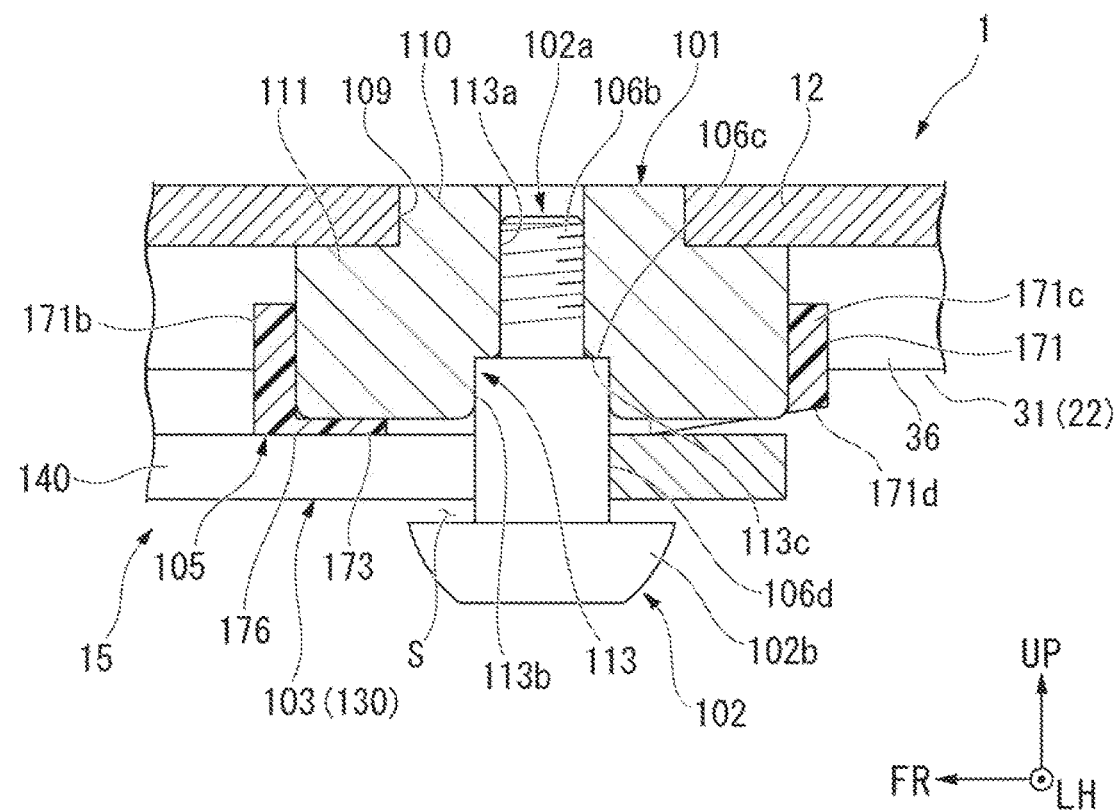
FIG. 6 is a sectional view corresponding to line VI-VI in FIG. 3.

FIG. 5 is a perspective view of the EA block 101 and the EA guide 105. FIG. 6 is a sectional view corresponding to line VI-VI in FIG. 3.

As shown in FIGS. 5 and 6, the EA block 101 is integrally formed of carbon steel such as SS400, for example. The EA block 101 is fixed downward in a front portion of the pipe 12. Specifically, the EA block 101 includes a fitting portion 110 and a pedestal portion 111.

The fitting portion 110 is fitted into a through-hole 109 (refer to FIG. 6) provided in the pipe 12. A surface of the fitting portion 110 which faces inward in the shaft radial direction is formed on a curved surface extending along the inner peripheral surface of the pipe 12.

The pedestal portion 111 is connected to a lower side of the fitting portion 110. The pedestal portion 111 is formed in a rectangular shape whose outer shape in a plan view when viewed in the up-down direction is larger than that of the fitting portion 110. A lower surface of the pedestal portion 111 is formed on a flat surface perpendicular to the shaft radial direction. The pedestal portion 111 is disposed so as to protrude downward from the pipe 12. The pedestal portion 111 is exposed outward of the housing main body 22 through the slit 36. In an example in FIG. 3, the lower surface of the pedestal portion 111 is located below the protruding walls 38 and 39. The EA block 101 is fixed to the pipe 12 by being welded to the pipe 12 in a boundary portion between the fitting portion 110 and the pedestal portion 111, for example. A method of fixing the EA block 101 and the pipe 12 can be changed as appropriate.

As shown in FIGS. 3 and 6, the EA block 101 has an attachment hole 113 that penetrates the EA block 101 in the shaft radial direction. Two attachment holes 113 are aligned in the left-right direction. In the following description, details of the attachment hole 113 will be described by using one attachment hole 113 as an example.

The attachment hole 113 is a stepped hole including a small diameter portion 113a and a large diameter portion 113b.

The small diameter portion 113a is formed across the fitting portion 110 and the pedestal portion 111 in the EA block 101. A female screw is formed on an inner peripheral surface of the small diameter portion 113a.

An inner diameter of the large diameter portion 113b is larger than that of the small diameter portion 113a. The large diameter portion 113b is connected to the outside of the small diameter portion 113a in the shaft radial direction. The large diameter portion 113b is open on the lower surface of the pedestal portion 111. A hole stepped surface 113c connecting the large diameter portion 113b and the small diameter portion 113a to each other is formed on a flat surface intersecting with (for example, perpendicular to) the shaft radial direction.

The EA bolt 102 is separately fastened to each of the attachment holes 113 while protruding downward from the pedestal portion 111. The EA bolt 102 is formed of a material which is harder than that of the EA block 101. The EA bolt 102 is a so-called stepped bolt. A shaft portion 102a of the EA bolt 102 includes a small diameter shaft portion 106b located in a tip portion and a large diameter shaft portion (sliding portion) 106d connected to a base end portion of the small diameter shaft portion 106b via a bolt stepped surface 106c.

A male screw is formed on an outer peripheral surface of the small diameter shaft portion 106b. The small diameter shaft portion 106b is fastened inside the small diameter portion 113a of the EA block 101.

The bolt stepped surface 106c projects outward in an annular shape in the radial direction (bolt radial direction) of the EA bolt 102 from a base end edge of the small diameter shaft portion 106b. When the small diameter shaft portion 106b is fastened to the small diameter portion 113a, the bolt stepped surface 106c is close to or in contact with the hole stepped surface 113c. The bolt stepped surface 106c comes into contact with the hole stepped surface 113c so that the EA bolt 102 is positioned in the up-down direction with respect to the EA block 101.

The large diameter shaft portion 106d protrudes downward from the EA block 101 where an upper end portion is accommodated inside the large diameter portion 113b. The large diameter shaft portion 106d has a columnar shape disposed coaxially with the small diameter shaft portion 106b. The upper end portion of the large diameter shaft portion 106d is surrounded by the large diameter portion 113b. In the EA bolt 102, the outer peripheral surface of the large diameter shaft portion 106d comes into contact with the inner peripheral surface of the large diameter portion 113b, thereby restricting displacement (tilting) of the EA bolt 102 in the bolt radial direction at the time of the secondary collision or during the telescopic operation. In the shown example, the protrusion amount of the large diameter shaft portion 106d from the lower surface of the pedestal portion 111 is larger than the length of a portion accommodated inside the large diameter portion 113b.

A head portion (restriction member) 102b of the EA bolt 102 projects outward in the bolt radial direction from the base end portion of the large diameter shaft portion 106d.

As shown in FIGS. 3 and 4, the EA plate 103 includes a main plate 130 and a sub plate 131.

The main plate 130 is formed in a crank shape in a front view when viewed in the front-rear direction. The main plate 130 is formed of a material (for example, SPHC) having rigidity lower than that of the EA bolt 102. Specifically, the main plate 130 includes an attachment piece 132, an operating piece 134, and a support piece 135.

The attachment piece 132 is attached to the telescopic movable portion 83 from above. That is, the EA plate 103 is configured to be movable forward and rearward integrally with the telescopic movable portion 83.

The operating piece 134 extends inward in the left-right direction from a lower end edge of the attachment piece 132. The operating piece 134 is disposed below the pipe 12. Specifically, a rear end portion of the operating piece 134 overlaps the EA bolt 102 in a plan view. A long hole (first long hole 140 and second long hole 141) is formed in the operating piece 134.

The support piece 135 extends upward from an end edge of the operating piece 134 which is located on a side opposite to a coupling piece 133. An upper end portion of the support piece 135 is accommodated inside the recess portion 39a. A guide rail 144 is provided inside the recess portion 39a. The guide rail 144 is formed in a U-shape which is open downward, and extends in the front-rear direction inside the recess portion 39a. The guide rail 144 is fitted into the recess portion 39a. The guide rail 144 is formed of a material (for example, a resin material) having a friction coefficient smaller than that of an inner surface of the recess portion 39a. The support piece 135 is accommodated inside the guide rail 144. That is, the guide rail 144 guides the movement in the front-rear direction while restricting the movement of the main plate 130 (EA plate 103) in the left-right direction with respect to the housing main body 22.

The sub plate 131 connects the telescopic movable portion 83 and the operating piece 134 to each other. Specifically, an outer end portion of the sub plate 131 in the left-right direction is attached to the telescopic movable portion 83 from below. That is, the sub plate 131 pinches the telescopic movable portion 83 with the attachment piece 132 in the up-down direction. An inner end portion of the sub plate 131 in the left-right direction is connected to the operating piece 134.

Figure 7:
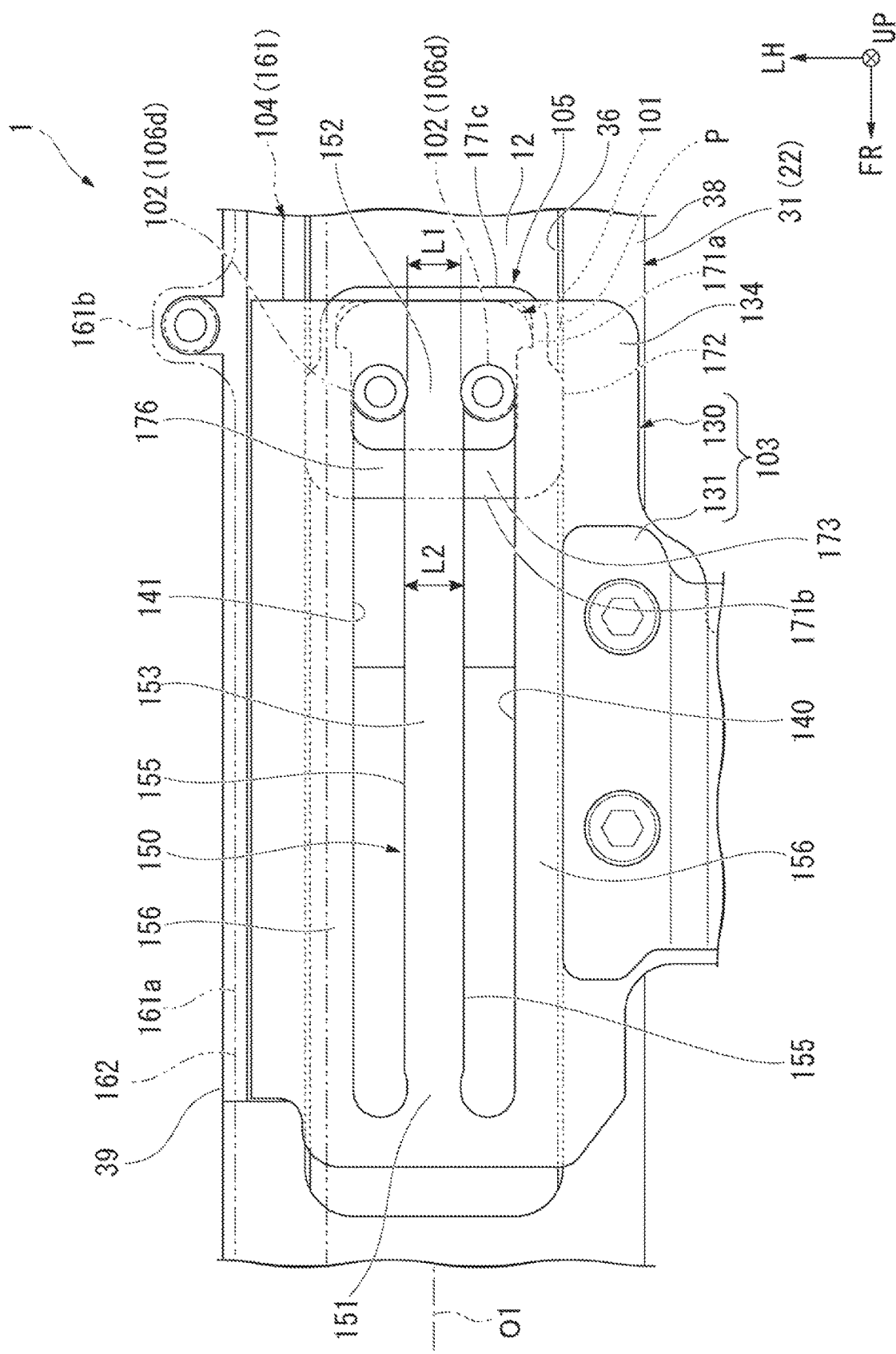
FIG. 7 is a view taken along an arrow VII in FIG. 3.

FIG. 7 is a view taken along an arrow VII in FIG. 3.

Here, as shown in FIG. 7, each of the above-described long holes (guide holes) 140 and 141 penetrates the operating piece 134 in the up-down direction and extends in the front-rear direction. Each of the long holes 140 and 141 is formed laterally symmetrically in a plan view. A portion of the operating piece 134 which is located between the long holes 140 and 141 forms an extending portion 150 extending in the front-rear direction. The extending portion 150 includes a front side constriction portion 151, a rear side constriction portion 152, and a wide portion 153.

The front side constriction portion 151 is located in a front end portion of the extending portion 150. The front side constriction portion 151 is recessed inward in the left-right direction with respect to the wide portion 153.

The rear side constriction portion 152 is located in a rear end portion of the extending portion 150. The rear side constriction portion 152 is recessed inward in the left-right direction with respect to the wide portion 153. The width of each of the constriction portions 151 and 152 in the left-right direction is set to be equal to or smaller than a distance L1 between the EA bolts 102 (large diameter shaft portions 106d). The front side constriction portion 151 is not an essential configuration.

Each of the EA bolts 102 is disposed in a rear end portion (portion corresponding to the rear side constriction portion 152) inside each of the long holes 140 and 141. The EA bolt 102 is inserted into each of the long holes 140 and 141 from below, and thereafter, is fastened to the EA block 101. The EA bolt 102 is guided along the long holes 140 and 141 when moving forward with respect to the EA plate 103 at the time of the secondary collision. As shown in FIG. 6, the EA bolt 102 is fastened to the EA block 101, and the large diameter shaft portion 106d is disposed inside the long holes 140 and 141. The EA bolt 102 is fastened to the EA block 101, and the head portion 102b overlaps the EA plate 103 in a plan view where a gap S is formed between the head portion 102b and the EA plate 103. Specifically, the head portion 102b overlaps a peripheral portion of the long holes 140 and 141 in the EA plate 103 (operating piece 134).

As shown in FIG. 7, the width L2 of the wide portion 153 in the left-right direction is set to be larger than the distance L1 between the EA bolts 102 (large diameter shaft portions 106d). A portion bulging outward in the left-right direction with respect to each of the constriction portions 151 and 152 in the wide portion 153 forms a resistance portion 155 that projects into the long holes 140 and 141. The resistance portion 155 overlaps an inner end portion in the left-right direction of each of the EA bolts 102 (large diameter shaft portion 106d) in a front view. The resistance portion 155 is configured to be plastically deformable in such a manner that each of the large diameter shaft portions 106d slides when a predetermined load is input forward to the pipe 12 at the time of the secondary collision. The resistance portion 155 is not deformable when the load acting on the EA block 101 via the pipe 12 is smaller than a predetermined value (for example, during the telescopic operation). That is, when the load acting on the pipe 12 is smaller than the predetermined value, the relative movement of the EA block 101 with respect to the EA plate 103 is restricted while each of the EA bolts 102 is fitted into each of the long holes 140 and 141 (rear side constriction portions 152).

A portion of the operating piece 134 which is located on a side opposite to the extending portion 150 (outside in the left-right direction) with respect to each of the long holes 140 and 141 forms a guide 156 extending in the front-rear direction. The guide 156 is located outside each of the EA bolts 102 in the left-right direction. The guide 156 restricts an outward displacement of each of the EA bolts 102 in the left-right direction.

As shown in FIGS. 3 and 4, the EA cover 104 restricts a downward movement of the EA plate 103 with respect to the housing main body 22 (EA bolt 102). The EA cover 104 is disposed on a side (left side) opposite to the telescopic mechanism 46 side with respect to the axis O1 in a lower portion of the housing main body 22. The EA cover 104 covers a portion of the EA plate 103 from below.

The EA cover 104 includes a restriction plate 161 and a sliding plate 162.

The restriction plate 161 is formed of a material (for example, a metal material) having higher rigidity than that of the sliding plate 162. The restriction plate 161 extends in the front-rear direction while the up-down direction is set as a thickness direction. The restriction plate 161 includes an overlapping piece 161a and an attachment piece 161b.

The overlapping piece 161a extends in the front-rear direction below the second protruding wall 39. The overlapping piece 161a overlaps a left end portion (end portion on a side opposite to the telescopic mechanism 46) of the operating piece 134 from below. In the shown example, the overlapping piece 161a overlaps the guide 156 on the left side of the extending portion 150. The length of the overlapping piece 161a in the front-rear direction is longer than that of the EA plate 103 (operating piece 134).

The attachment piece 161b projects outward or forward in the left-right direction from the overlapping piece 161a. The attachment piece 161b is fixed to the housing main body 22 in a portion deviating from an operation locus of the EA plate 103 during the telescopic operation. The attachment piece 161b is fixed to the housing main body 22 by a bolt, for example.

The sliding plate 162 overlaps an upper surface of the overlapping piece 161a. The sliding plate 162 is formed of a material (for example, a resin material) having a friction coefficient smaller than that of the restriction plate 161. The sliding plate 162 is fixed to the overlapping piece 161a. The sliding plate 162 may be fixed to the restriction plate 161 by press-fitting a pin into the overlapping piece 161a or by locking a pin having a barb claw to the overlapping piece 161a. The sliding plate 162 may be fixed to the restriction plate 161 by adhesion.

The sliding plate 162 is located between the overlapping piece 161a and the operating piece 134. An upper surface of the sliding plate 162 is close to or in contact with a lower surface of the operating piece 134. The EA cover 104 may be configured not to include the sliding plate 162.

As shown in FIG. 4, the EA guide 105 is disposed between the EA block 101 and the housing main body 22, and between the EA block 101 and the EA plate 103. The EA guide 105 reduces sliding resistance during the telescopic operation or at the time of the secondary collision. The EA guide 105 is formed of at least a material having a friction coefficient smaller than that of the EA block 101. As this material, the EA guide 105 of the present embodiment is integrally formed of a resin material (for example, POM or PA66). As the material having the friction coefficient smaller than that of the EA block 101, for example, the EA guide 105 can adopt any desired material other than the resin material, as long as the material has rigidity lower than that of the EA block 101, the EA bolt 102, or the EA plate 103.

As shown in FIGS. 3 to 6, the EA guide 105 includes a frame portion 171, a lateral projecting portion (second reduction portion) 172, and a lower side projecting portion (first reduction portion) 173.

The frame portion 171 is formed in a rectangular frame shape that surrounds a periphery of the EA block 101 (pedestal portion 111). The frame portion 171 includes side crosspieces 171a located on both sides in the left-right direction with respect to the pedestal portion 111, a front crosspiece 171b connecting front end portions of the side crosspieces 171a to each other in front of the pedestal portion 111, and a rear crosspiece 171c connecting rear end portions of the side crosspieces 171a to each other behind a pedestal portion 111. A corner portion (boundary portion of each of the crosspieces 171a to 171c) of the frame portion 171 is rounded.

In the frame portion 171, the front portion of the side crosspiece 171a and the front crosspiece 171b protrude downward from the lower surface of the pedestal portion 111.

In the frame portion 171, a relief portion 171d is formed in a portion from the rear portion of the side crosspiece 171a to the rear crosspiece 171c. The relief portion 171d is a portion formed so that a height in the up-down direction of the portion from the rear portion of the side crosspiece 171a to the rear crosspiece 171c is lower than f the front crosspiece 171b. Specifically, the relief portion 171d is configured so that a lower end edge of the rear crosspiece 171c from the rear portion of the side crosspiece 171a is formed on an inclined surface extending upward toward the rear. Therefore, the lower end edge of the rear crosspiece 171c is located at an uppermost position in the lower end edge of the frame portion 171. In the shown example, the lower end edge of the rear crosspiece 171c is located to be flush with the lower surface of the EA block 101, or is located above the lower surface of the EA block 101. The relief portion 171d is not limited to the inclined surface as long as the relief portion 171d is located above the front crosspiece 171b, and may be formed in a stepped shape. The relief portion 171d is not an essential configuration.

As shown in FIGS. 3 and 5, each of the lateral projecting portions 172 projects outward from a front outer surface of the side crosspiece 171a in the left-right direction. The lateral projecting portion 172 is close to or in contact with an inner surface of the slit 36 in the left-right direction. The lateral projecting portion 172 is configured to be slidable on the inner surface of the slit 36 when the EA guide 105 moves inside the slit 36 in the front-rear direction.

As shown in FIGS. 5 and 7, a rear outer surface of the side crosspiece 171a is located inside the lateral projecting portion 172 in the left-right direction. Therefore, a gap P for avoiding contact between the EA guide 105 and the inner surface of the slit 36 is formed between the rear outer surface of the side crosspiece 171a and the inner surface of the slit 36. The rear end portion of the lateral projecting portion 172 extends inward in the left-right direction toward the rear and is formed on an inclined surface connected to the rear outer surface of the side crosspiece 171a. However, the lateral projecting portion 172 may be formed over the whole side crosspiece 171a in the front-rear direction.

As shown in FIGS. 5 and 6, the lower side projecting portion 173 projects inward of the frame portion 171 from the front portion of the side crosspiece 171a and the front crosspiece 171b. Specifically, the lower side projecting portion 173 overlaps the lower surface of the EA block 101 in a plan view. The lower side projecting portion 173, the lateral projecting portion 172, the front portion of the side crosspiece 171a, and the upper surface of the front crosspiece 171b form a sliding surface 176 that is close to or in contact with the upper surface of the operating piece 134. The sliding surface 176 is located between the lower surface of the pedestal portion 111 and the upper surface of the operating piece 134 and is provided to be slidable on the upper surface of the operating piece 134 at the time of the secondary collision.

[Operation]

Next, an operation of the above-described steering device 1 will be described. In the following description, a tilt operation, a telescopic operation, and a collapse stroke at the time of the secondary collision will be mainly described.

<Tilt Operation>

As shown in FIG. 1, in the tilt operation, a driving force of the tilt motor unit 51 is transmitted to the housing main body 22 via the link member 70 so that the housing main body 22 pivots around the axis O2. Specifically, when the steering wheel 2 is adjusted upward, the tilt motor unit 51 is driven to rotate the tilt wire 61 and the tilt shaft 62 in a first direction (loosening direction of the tilt nut 71), for example. When the tilt shaft 62 rotates in the first direction, the tilt nut 71 moves rearward with respect to the tilt shaft 62. Since the tilt nut 71 moves rearward, the housing main body 22 pivots upward around the axis O2 with respect to the tilt bracket 21. As a result, the steering wheel 2 pivots upward around the axis O2 together with the housing main body 22, the pipe 12, and the steering shaft 13.

When the steering wheel 2 is adjusted downward, the tilt shaft 62 is rotated in a second direction (tightening direction of the tilt nut 71). Then, the tilt nut 71 moves forward with respect to the tilt shaft 62. Since the tilt nut 71 moves forward, the housing main body 22 pivots downward around the axis O2 with respect to the tilt bracket 21. As a result, the steering wheel 2 pivots downward around the axis O2 together with the housing main body 22, the pipe 12, and the steering shaft 13.

<Telescopic Operation>

In the telescopic operation, the driving force of the telescopic motor unit is transmitted to the pipe 12 via the EA plate 103 and the EA block 101 so that the pipe 12 and the inner shaft 42 move forward and rearward with respect to the housing 11 and the outer shaft 43. Specifically, when the steering wheel 2 is moved rearward, the telescopic motor unit 81 is driven to rotate the telescopic coupling portion 82 in the first direction (loosening direction of the telescopic movable portion 83), for example. When the telescopic coupling portion 82 rotates in the first direction, the telescopic movable portion 83 and the EA plate 103 move rearward with respect to the telescopic coupling portion 82. The driving force of the EA plate 103 is transmitted to the EA bolt 102. In this case, the relative movement of the EA bolt 102 with respect to the EA plate 103 is restricted, where each of the EA bolts 102 is fitted into the rear side constriction portion 152. Therefore, the driving force of the EA bolt 102 is transmitted to the pipe 12 via the EA block 101. As a result, the pipe 12 moves rearward together with the inner shaft 42 so that the steering wheel 2 moves rearward.

When the steering wheel 2 is moved forward, the telescopic coupling portion 82 is rotated in the second direction, for example. When the telescopic coupling portion 82 rotates in the second direction (tightening direction of the telescopic movable portion 83), the telescopic movable portion 83 and the EA plate 103 move forward with respect to the telescopic coupling portion 82. As the EA plate 103 moves forward, the driving force of the EA plate 103 is transmitted to the pipe 12 via the EA bolt 102 and the EA block 101. In this manner, the pipe 12 moves forward so that the steering wheel 2 moves forward.

<At Time of Secondary Collision>

Next, an operation at the time of the secondary collision will be described.

As shown in FIGS. 6 and 7, at the time of the secondary collision (when a collision load is equal to or greater than a predetermined value), the steering wheel 2 moves forward with respect to the housing main body 22 and the outer shaft 43 together with the pipe 12, the EA block 101, the EA bolt 102, and the inner shaft 42.

Figure 8:
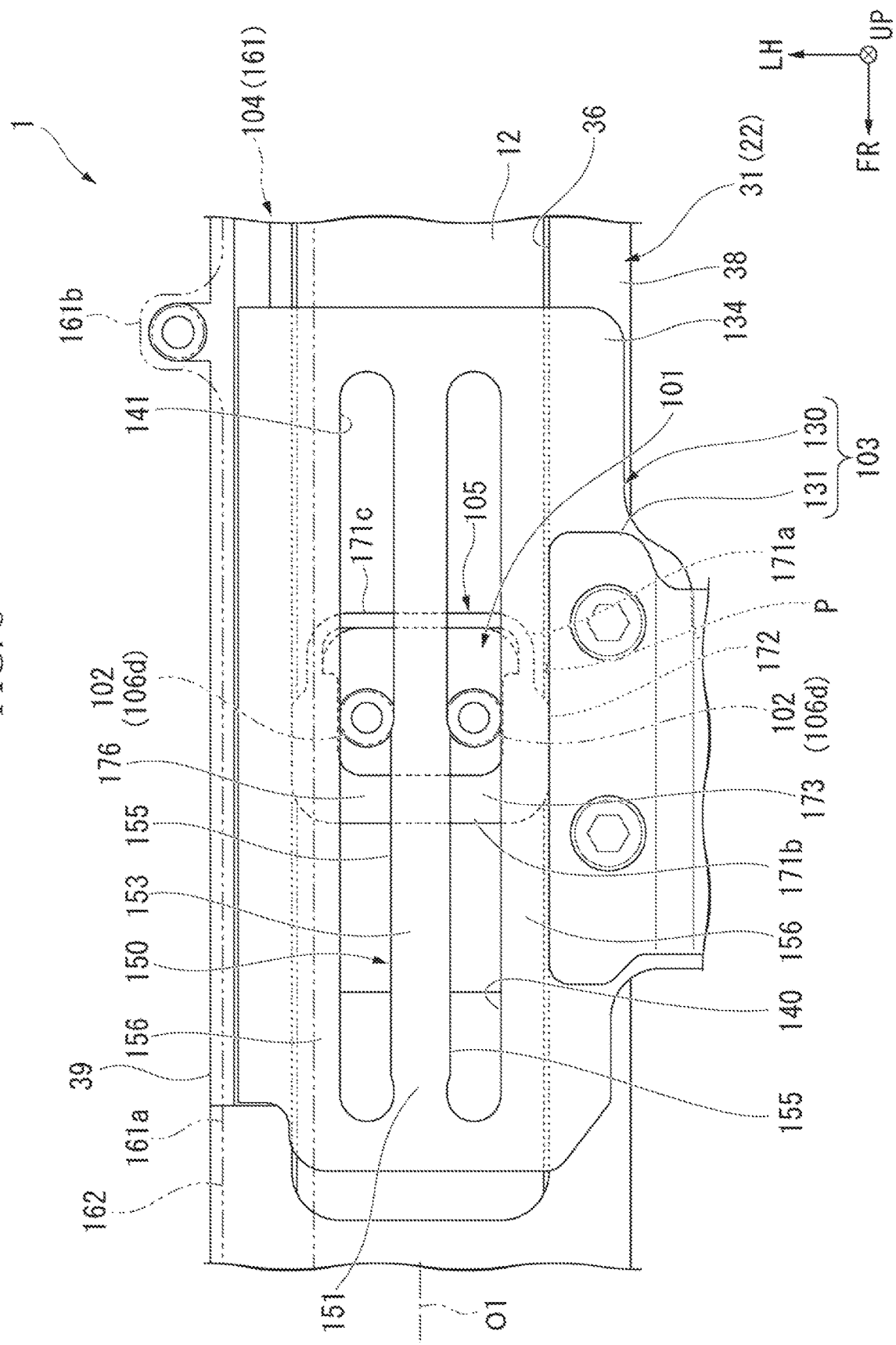
FIG. 8 is a view for describing an operation at the time of a secondary collision in the steering device according to the first embodiment.

FIG. 8 is a view for describing the operation at the time of the secondary collision.

As shown in FIGS. 7 and 8, at the time of the secondary collision, a forward collision load acts on the pipe 12 via the steering wheel 2. In this case, the collision load acts on the EA plate 103 via the EA block 101 and the EA bolt 102. However, in the present embodiment, the female screw 83a of the telescopic movable portion 83 and the male screw 82a of the telescopic coupling portion 82 engage with each other in the front-rear direction. Accordingly, the forward movement of the EA plate 103 with respect to the housing 11 is restricted. Therefore, the steering shaft 13, the pipe 12, the EA block 101, and the EA bolt 102 try to move forward with respect to the EA plate 103 and the housing 11.

In the present embodiment, the distance L1 between the large diameter shaft portions 106d of each of the EA bolts 102 is narrower than the width L2 of the wide portion 153. Therefore, the EA bolt 102 moves forward with respect to the EA plate 103 while causing the large diameter shaft portion 106d to squeeze the extending portion 150. Specifically, when the large diameter shaft portion 106d slides on the outer surface of the wide portion 153, the resistance portion 155 is plastically deformed (crushed) inward in the left-right direction. In this way, in a process during which the steering shaft 13 moves forward with respect to the EA plate 103 and the housing 11, an impact load applied to a driver at the time of the secondary collision is cushioned by a load generated when the large diameter shaft portion 106*d* squeezes the extending portion 150.

A load generated between the EA bolt 102 and the EA plate 103 can be adjusted by changing a difference between the distance L1 between the large diameter shaft portions 106*d* and the width L2 of the wide portion 153, or the thickness of the wide portion 153. At the time of the secondary collision, in addition to the load when the extending portion 150 is squeezed by each of the large diameter shaft portions 106*d*, for example, the impact load may be cushioned by the sliding resistance between the outer peripheral surface of the pipe 12 and the inner peripheral surface of the holding cylinder 31. A paint having a high friction coefficient may be applied to the sliding portion between the outer peripheral surface of the pipe 12 and the inner peripheral surface of the holding cylinder 31 or uneven processing may be applied thereto.

The steering device 1 of the present embodiment is configured so that the EA guide 105 (sliding surface 176) formed of the material having the friction coefficient smaller than that of the EA block 101 is provided between the EA block 101 and the EA plate 103.

According to this configuration, at the time of the secondary collision, the sliding surface 176 slides on the upper surface of the operating piece 134. In this manner, compared to a case where the EA block 101 and the EA plate 103 slide, the sliding resistance generated against the EA plate 103 can be reduced. In this manner, desired sliding resistance can be generated at a desired location (for example, a location between the resistance portion 155 and the large diameter shaft portion 106*d*). As a result, load fluctuations at the time of the secondary collision can be stabilized, and desired impact absorbing performance is easily secured.

In the present embodiment, the EA guide 105 is configured to include a sliding surface 176 disposed between the EA plate 103 and the pedestal portion 111, and a lateral projecting portion 172 that faces the inner surface of the slit 36 around the pedestal portion 111.

According to this configuration, at the time of the secondary collision, the sliding resistance generated between the sliding surface 176 and the EA plate 103 can be reduced. At the time of the secondary collision, the outer surface of the lateral projecting portion 172 slides on the inner surface of the slit 36. In this manner, compared to a case where the outer surface of the EA block 101 slides on the inner surface of the slit 36, the sliding resistance generated against the housing main body 22 can also be reduced. Moreover, the outer surface of the lateral projecting portion 172 comes into contact with the inner surface of the slit 36. Accordingly, at the time of the secondary collision, it is possible to prevent the rotation of the pipe 12 around the axis O1. In this manner, at the time of the secondary collision, the EA guide 105 can be prevented from being caught on the inner surface of the slit 36, and the collapse stroke can be smoothly performed.

Even during the telescopic operation, the outer surface of the lateral projecting portion 172 slides on the inner surface of the slit 36. In this manner, compared to a case where the outer surface of the EA block 101 slides on the inner surface of the slit 36, it is possible to reduce abnormal noise or the sliding resistance generated during the telescopic operation.

In particular, in the present embodiment, the sliding surface 176 and the lateral projecting portion 172 are formed integrally with the EA guide 105. Accordingly, the configuration can be simplified, and cost saving can be achieved.

The steering device 1 of the present embodiment adopts a configuration in which the pedestal portion 111 is fitted into the EA guide 105.

According to this configuration, rattling or dropping of the EA guide 105 can be prevented. Accordingly, it is possible to realize a stable telescopic operation and the collapse stroke for a long period of time.

The steering device 1 of the present embodiment adopts a configuration in which the relief portion 171*d* located above the sliding surface 176 is formed in the portion of the EA guide 105 which is located rearward of the EA bolt 102.

According to this configuration, it is possible to prevent a deformation mark (burr) generated by the large diameter shaft portion 106*d* squeezing the extending portion 150 from coming into contact with the EA guide 105. In this manner, it is possible to prevent the collapse stroke from being hindered by the deformation mark.

The steering device 1 of the present embodiment is configured to include the telescopic coupling portion 82 coupled to the telescopic motor unit 81, and the telescopic movable portion 83 having the female screw 83*a* coupled to the EA plate 103 and engaging with the male screw 82*a* of the telescopic coupling portion 82 in the front-rear direction and transmitting the driving force of the telescopic motor unit 81 to the shaft support portion (EA block 101 or pipe 12) via the male screw 82*a* and the female screw 83*a*.

According to this configuration, at the time of the secondary collision, the male screw 82*a* of the telescopic coupling portion 82 and the female screw 83*a* of the telescopic movable portion 83 come into contact with each other. In this manner, the forward movement of the telescopic movable portion 83 with respect to the telescopic coupling portion 82 is restricted. In this manner, at the time of the secondary collision, it is possible to prevent the EA plate 103 from moving forward together with the telescopic coupling portion 82. Therefore, a load can be effectively generated between the extending portion 150 and the large diameter shaft portion 106*d*. As a result, desired impact absorbing performance can be secured.

The steering device 1 of the present embodiment is configured to include the EA cover 104 that overlaps the EA plate 103 in the up-down direction and restricts the downward movement with respect to the EA bolt 102.

According to this configuration, at the time of the secondary collision, when the load acting between the large diameter shaft portion 106*d* and the extending portion 150 increases, the EA plate 103 is pressed downward by each of the large diameter shaft portions 106*d*. Then, in the EA plate 103, the large diameter shaft portion 106*d* tries to be separated from the long holes 140 and 141. In this case, the operating piece 134 comes into contact with the EA cover 104 via the sliding plate 162. In this manner, the downward movement of the EA plate 103 with respect to the housing main body 22 (large diameter shaft portion 106*d*) is restricted. As a result, the large diameter shaft portion 106*d* can be prevented from being separated from the EA plate 103, and energy absorbed by the load absorbing mechanism 15 can be stabilized over an entire region of the collapse stroke.

Moreover, in the present embodiment, the head portion 102*b* of the EA bolt 102 overlaps the EA plate 103 in a plan view. Therefore, at the time of the secondary collision, the downward movement of the EA plate 103 with respect to the EA bolt 102 can also be restricted by the head portion 102b.

Second Embodiment

Figure 9:
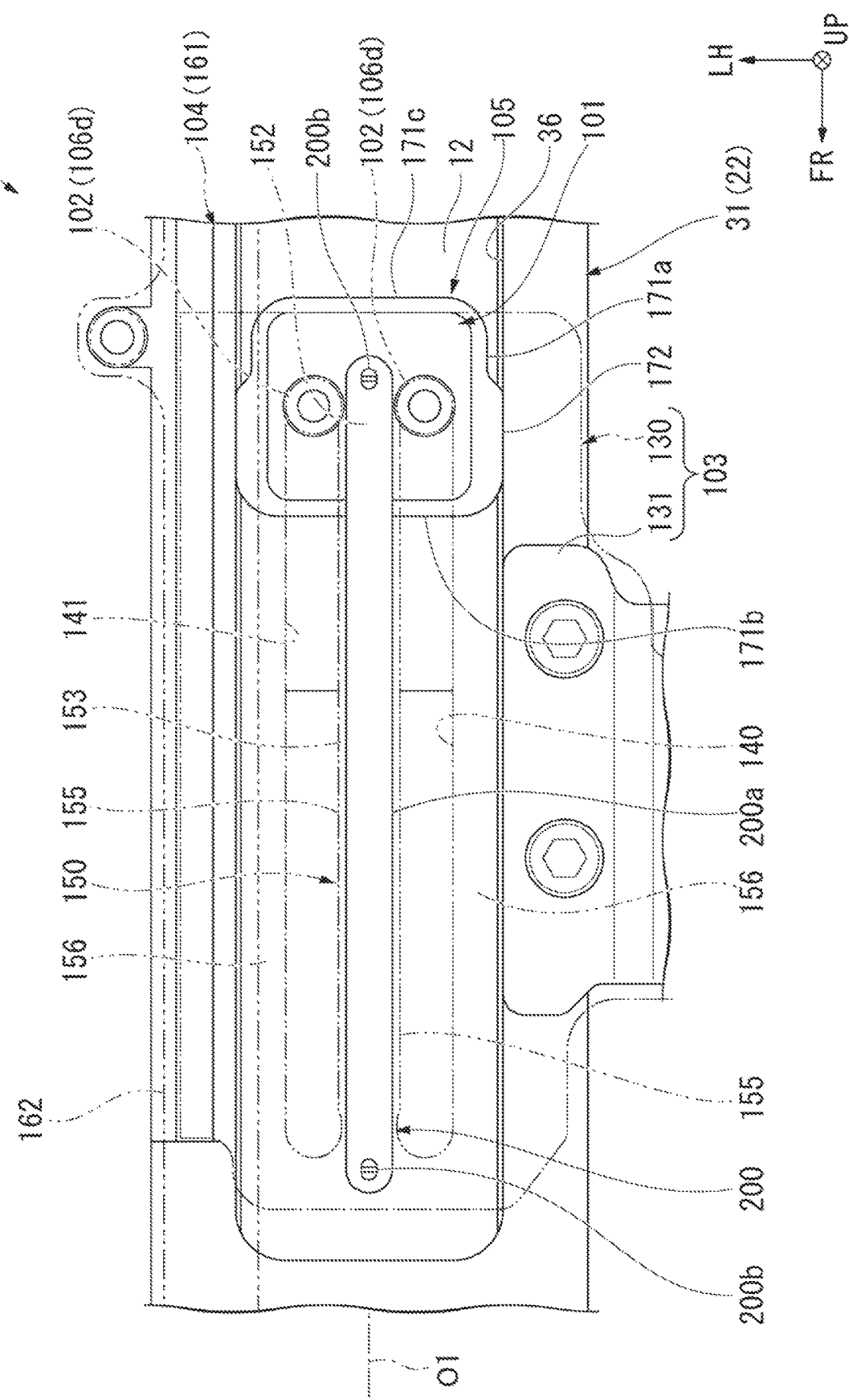
FIG. 9 is a bottom view corresponding to FIG. 7 in a steering device according to a second embodiment.
Figure 10:
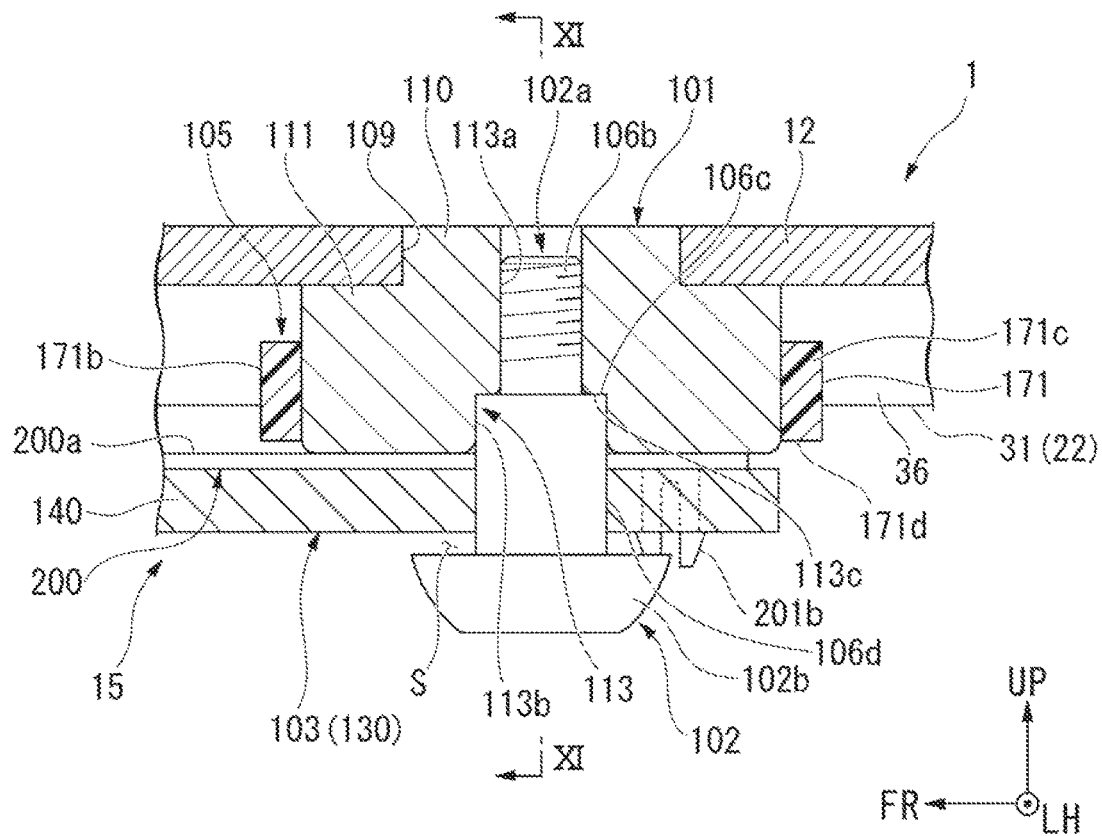
FIG. 10 is a sectional view corresponding to FIG. 6 in the steering device according to the second embodiment.
Figure 11:
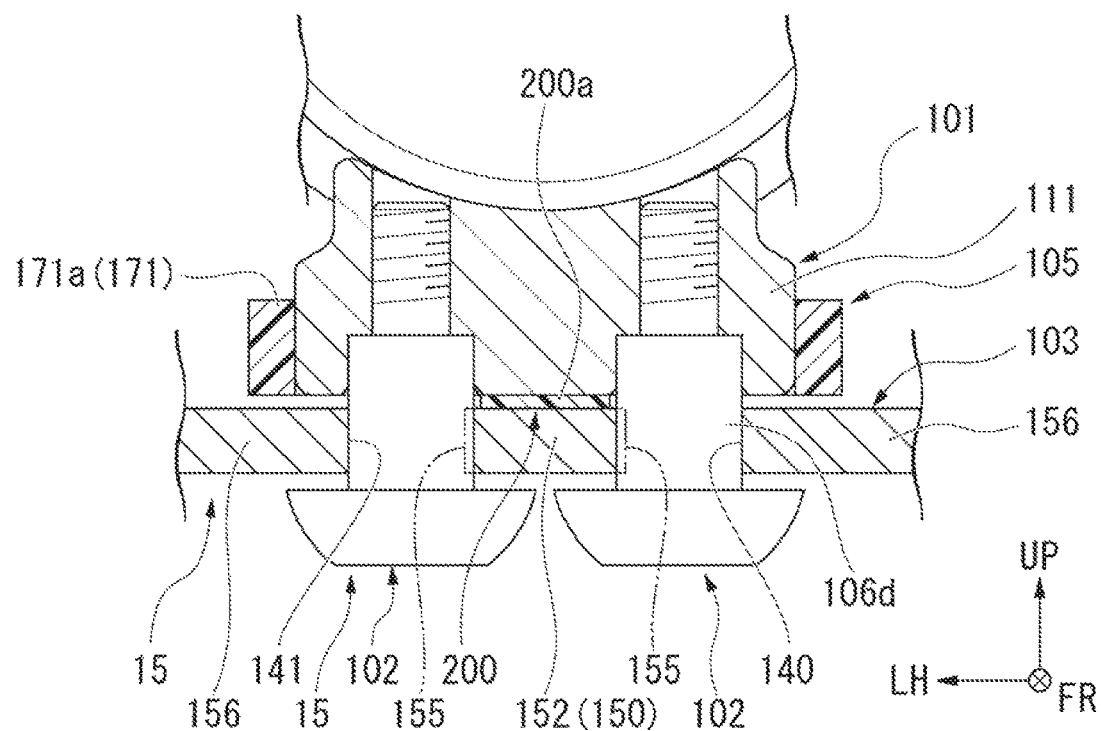
FIG. 11 is a sectional view corresponding to line XI-XI in FIG. 10.

A second embodiment is different from the first embodiment in that a low sliding member 200 is provided in the EA plate 103 in place of the lower side projecting portion 173 (refer to FIG. 5). FIG. 9 is a bottom view corresponding to FIG. 7 in the steering device 1 according to the second embodiment. FIG. 10 is a sectional view corresponding to FIG. 6 in the steering device 1 according to the second embodiment. FIG. 11 is a sectional view corresponding to line XI-XI in FIG. 10.

In the steering device 1 shown in FIGS. 9 to 11, the low sliding member 200 is attached to the upper surface of the EA plate 103 while overlapping the pipe 12, the EA block 101, and the EA plate 103 when viewed in the up-down direction. Specifically, the low sliding member 200 includes a facing portion 200a and an attachment portion 200b.

The facing portion 200a is formed in a plate shape extending in the front-rear direction while the up-down direction is set as the thickness direction. The facing portion 200a extends in the front-rear direction in a portion of the EA plate 103 (operating piece 134) which includes the upper surface of the extending portion 150. In the shown example, the front end portion of the facing portion 200a reaches a portion of the upper surface of the operating piece 134 which is located in front of the extending portion 150. The rear end portion of the facing portion 200a reaches a portion of the upper surface of the operating piece 134 which is located behind the extending portion.

The facing portion 200a is located between the operating piece 134 and the EA block 101, and is configured to be slidable on the lower surface of the EA block 101 at the time of the secondary collision. Therefore, a range in the front-rear direction in the facing portion 200a may be at least provided on a movement locus of the EA block 101 at the time of the secondary collision.

It is preferable that the width of the facing portion 200a in the left-right direction is narrower than a minimum width of the extending portion 150 (constriction portions 151 and 152). That is, the facing portion 200a is located inside the resistance portion 155 in the left-right direction. In this manner, at the time of the secondary collision, it is possible to prevent interference between the facing portion 200a and the large diameter shaft portion 106d.

Moreover, there is a gap in the up-down direction between the resistance portion 155 and the lower surface of the EA block 101. In this manner, it is possible to prevent a deformation mark (burr) generated by plastically deforming the resistance portion 155 from coming into contact with the low sliding member 200 or the EA block 101. As a result, it is possible to prevent the collapse stroke from being hindered by the deformation mark.

The attachment portions 200b are provided in both end portions of the facing portion 200a in the front-rear direction. The attachment portion 200b protrudes upward from the facing portion 200a. The attachment portion 200b is held by the operating piece 134 while penetrating the operating piece 134 in the up-down direction.

In the second embodiment, in addition to achieving operational effects the same as those of the above-described first embodiment, the following operational effects are achieved.

That is, the low sliding member 200 is provided for the plate-shaped EA plate (one member) 103. Accordingly, the sliding resistance between the EA block (the other member) 101 and the EA plate 103 can be reduced. Therefore, the configuration can be simplified, and cost saving can be achieved.

In the second embodiment, a configuration including the EA block 101 (lateral projecting portion 172) in addition to the low sliding member 200 has been described. However, the present disclosure is not limited to this configuration. In the steering device 1 of the second embodiment, at least the low sliding member 200 may be provided.

In the second embodiment, a configuration has been described in which the low sliding member 200 is provided on the lower surface of the extending portion 150. However, the present disclosure is not limited to this configuration. The low sliding member 200 may be provided in the EA plate 103 to be slidable between the EA plate 103 and the EA block 101 (or the pipe 12).

Hitherto, the preferred embodiment according to the present disclosure has been described. However, the present disclosure is not limited to the embodiment. Additions, omissions, substitutions, and other modifications of the configurations can be made within the scope not departing from the concept of the present disclosure. The present disclosure is not limited by the above-described configurations, and is limited only by the appended claims.

For example, in the above-described embodiment, a configuration has been described in which the axis O1 intersects the front-rear direction. However, the present disclosure is not limited to the configuration. The axis O1 may coincide with the front-rear direction of the vehicle.

In the above-described embodiment, a case has been described where the telescopic mechanism 46 is the feed screw mechanism. However, the present disclosure is not limited to the configuration. For example, the telescopic mechanism 46 may adopt a gear.

In the above-described embodiment, a so-called electric steering device 1 in which the telescopic operation and the tilt operation can be performed by the motor units 51 and 81 has been described. However, the present disclosure is not limited to this configuration. The steering device 1 according to the present disclosure may be adopted as a manual steering device 1 for switching the movement and restriction of the pipe 12 in the front-rear direction by using a tightening load between the pipe and the housing.

In the above-described embodiment, a configuration has been described in which the EA bolt 102 is fixed to the pipe (shaft support portion) 12 via the EA block (shaft support portion) 101. However, the present disclosure is not limited to this configuration. The EA bolt 102 may be directly fixed to the pipe (shaft support portion) 12 (may be configured not to include the EA block 101).

In the above-described embodiment, a configuration has been described in which the steering shaft 13 is inserted into (insertion hole) of the pipe 12 forming the shaft support portion to be rotatable. However, the present disclosure is not limited to this configuration. The shaft support portion is not limited to a cylindrical shape as long as the shaft support portion has a configuration that supports the steering shaft 13 to be rotatable. For example, the shaft support portion may have an insertion hole into which the steering shaft 13 is inserted and may be configured to support the steering shaft 13 to be rotatable. In this case, the shaft support portion may have a rectangular parallelepiped shape having the insertion hole.

In the above-described embodiment, a configuration has been described in which the EA guide 105 is formed in a rectangular frame shape. However, as long as the EA guide 105 has a configuration that reduces the sliding resistance against the EA plate 103 at least at the time of the secondary collision, the shape can be changed as appropriate. For example, in the above-described embodiment, a configuration has been described in which the lower side projecting portion 173 is provided as the first reduction portion and the lateral projecting portion 172 is provided as the second reduction portion. However, the present disclosure is not limited to this configuration.

In the above-described embodiment, a configuration has been described in which the extending portion 150 is plastically deformed by the EA bolt 102 fixed to the EA block 101. However, the present disclosure is not limited to this configuration. The sliding portion that deforms the extending portion 150 may be formed integrally with the EA block 101.

In the above-described embodiment, a configuration has been described in which the EA bolt 102 (large diameter shaft portion 106d) serving as the sliding portion is provided on the pipe 12 side (first member), and the EA plate 103 serving as the guide plate is provided on the housing 11 side (second member). However, the present disclosure is not limited to this configuration. The sliding portion may be provided on the housing 11 side (second member), and the guide plate may be provided on the pipe 12 side (first member).

In the above-described embodiment, a configuration has been described in which the resistance portion 155 extends in the front-rear direction along both side edges of the extending portion 150. However, the present disclosure is not limited to this configuration. The resistance portion may be provided to be plastically deformable in a portion of the movement locus of the sliding portion. For example, a plurality of projections intermittently provided on both side edges of the extending portion 150 may be used as the resistance portion.

In the above-described embodiment, a case has been described where a cross-sectional shape of the large diameter shaft portion 106d is formed into a circular shape. However, the present disclosure is not limited to this configuration. The cross-sectional shape of the large diameter shaft portion 106d may be an oval shape or a polygonal shape.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

1: Steering Device
11: Housing (first member, second member)
12: Pipe (shaft support portion, second member, first member)
13: Steering Shaft
15: Load absorbing mechanism
36: Slit
46: Telescopic mechanism
81: Telescopic motor unit (actuator)
82a: Male screw (engaging portion)
83a: Female screw (engaged portion)
83: Telescopic movable portion (feed mechanism)
101: EA block (shaft support portion, one member, other member)
102b: Head portion (restriction member)
103: EA plate (guide plate, other member, one member)
104: EA cover (restriction member)
105: EA guide (low sliding member)
106d: Large diameter shaft portion (sliding portion)
111: Pedestal portion
140, 141: Long hole (guide hole)
155: Resistance portion
171d: relief portion
172: Lateral projecting portion (second reduction portion)
173: Lower side projecting portion (first reduction portion)
200: Low sliding member
O1: Axis

What is claimed is:

1. A steering device comprising:
a shaft support portion configured to support a steering shaft to be rotatable around an axis along a front-rear direction;
a housing supported by a vehicle body and configured to support the shaft support portion to be movable in the front-rear direction; and
a load absorbing mechanism disposed between the shaft support portion and the housing,
wherein the load absorbing mechanism includes
a sliding portion provided in a first member of the shaft support portion and the housing,
a guide plate provided in a second member of the shaft support portion and the housing, and having a guide hole guiding the sliding portion in accordance with a relative movement of the first member with respect to the second member in the front-rear direction at the time of a secondary collision, and a resistance portion projecting inside the guide hole and plastically deformed by the sliding portion at the time of the secondary collision, and
a low sliding member provided in one member of the guide plate and the first member while overlapping the guide plate and the first member in a radial direction intersecting with the axis when viewed in the front-rear direction, and
the low sliding member is formed of a material having a friction coefficient smaller than that of the one member and is configured to be slidable on the other member of the guide plate and the first member at the time of the secondary collision.

2. The steering device according to claim 1,
wherein the low sliding member is provided in the first member and is configured to be slidable on the guide plate.

3. The steering device according to claim 2,
wherein the first member is the shaft support portion,
the second member is the housing,
the shaft support portion includes
a pipe supporting the steering shaft to be rotatable, and
a pedestal portion protruding outward in the radial direction from the pipe,
the sliding portion is fixed to the pedestal portion while protruding outward in the radial direction,
the housing accommodates the pedestal portion, and has a slit formed so that the pedestal portion is movable forward at the time of the secondary collision, and
the low sliding member includes
a first reduction portion disposed between the guide plate and the pedestal portion in the radial direction, and a second reduction portion disposed around the pedestal portion and facing an inner surface of the slit.

4. The steering device according to claim 3,
wherein the low sliding member is formed in a frame shape when viewed in the radial direction, and
the pedestal portion is fitted into the low sliding member.

5. The steering device according to claim 3,
wherein a relief portion located inward in the radial direction with respect to the first reduction portion is formed in a portion of the low sliding member which is located rearward with respect to the sliding portion.

6. The steering device according to claim 1,
wherein the low sliding member is provided in the guide plate and is configured to be slidable on the first member.

7. The steering device according to claim 1, further comprising:
a telescopic mechanism provided between the load absorbing mechanism and the housing, and configured to move the load absorbing mechanism and the shaft support portion in the front-rear direction with respect to the housing, and
wherein the telescopic mechanism includes
an actuator coupled to the housing, and
a feed mechanism having an engaging portion coupled to the actuator and an engaged portion coupled to the load absorbing mechanism and engaged with the engaging portion in the front-rear direction, and transmitting a driving force of the actuator to the shaft support portion via the engaging portion and the engaged portion.

8. The steering device according to claim 1,
wherein a restriction member overlapping the guide plate in the radial direction and restricting a movement of the guide plate in the radial direction with respect to the sliding portion is provided in a portion of the sliding portion which is located on a side opposite to the first member in the radial direction.

* * * * *